United States Patent Office 3,763,158
Patented Oct. 2, 1973

3,763,158
3-PHENYL-(3H)-BENZO-1,2,3-TRIAZINONES-(4)
Gerhard Satzinger, 10 Vogesenstrasse; and Manfred Herrmann, 3a Bahnhofstrasse, both of 7803 Gundelfingen, Germany; and Karl-Otto Vollmer, 9b Mozartstrasse, 7800 Freiburg, Germany
No Drawing. Filed Dec. 9, 1971, Ser. No. 206,515
Claims priority, application Germany, Dec. 14, 1970, P 20 61 474.8
Int. Cl. C02d 55/08
U.S. Cl. 260—248 AS                     14 Claims

ABSTRACT OF THE DISCLOSURE

The present invention relates to 3-phenyl-(3H)-benzo-1,2,3-triazinones-(4) and to processes for their preparation. These compounds exhibit anti-secretory, muscle relaxant and tranquilizing properties while having very low toxicity.

---

The invention relates to a process for the preparation of substituted 3-phenyl-(3H)-benzo-1,2,3-triazinones-(4) of the General Formula I

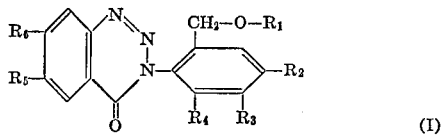

wherein $R_1$ means a hydrogen atom, a low molecular aliphatic acyl or carbamyl radical substituted with a carboxyl radical, if necessary, or an aroyl radical, and $R_2$, $R_3$, $R_4$, $R_5$, $R_6$ represent a hydrogen atom or a halogen atom; the invention is marked by the fact that an anthranil anilide of the General Formula II

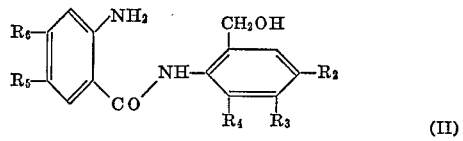

in which $R_2$ to $R_6$ have the above meanings is dissolved or suspended in an aqueous mineral acid with or without addition of a lower alkanol or ether, diazotized by alkali nitrite at $-5°$ to $+5°$ C., and the product of diazotization so obtained is cyclized by heating it to 10 to 40° C. without previous isolation. This type of synthesis has been known in principle, and was described e.g. in the monograph by Erickson-Wiley-Wystrach on "The 1,2,3- and 1,2,4-Triazines, Tetrazines and Pentazines" (1956). Additional literature on this subject: J. Org. Chem. 9, p. 55 (1944); 26, p. 613 (1961), and J. Pract. Chem. [2], 63, pp. 241–312 (1901). The 2'-hydroxymethyl-phenyl-benzotriazinones so obtained are then, if required, condensed with the corresponding anhydrides, acid chlorides of isocyanates in the presence of a basic condensation agent, preferably triethylamine, ethyldiisopropylamine or pyridine, in a solvent, preferably in dioxane, by heating them for several hours under reflux or in the absence of a solvent in the melt.

The 2'-hydroxymethyl-anthranil-anilides used as the starting materials can be prepared by reacting the corresponding o-nitrobenzoyl chlorides with the corresponding o-amino-benzyl alcohols in a solvent in the presence of a basic agent, preferably in a system like dioxane/ potassium carbonate or 1,2-dichloroethanepyridine, and by reduction of the 2'-hydroxymethyl-2-nitrobenzanilides by means of hydrazine hydrate and Raney nickel or by catalytic hydrogenation in a lower alcohol or in dioxane in the presence of Raney nickel. The o-nitrobenzoyl chlorides are obtained by the usual reaction of the o-nitrobenzoic acids substituted accordingly, with thionyl chloride preferably in the presence of a catalytic amount of dimethyl formamide; the corresponding o-amino-benzyl alcohols can be prepared from either the corresponding o-nitrobenzyl alcohols by means of reduction by hydrazine hydrate in the presence of Raney nickel or by means of reduction by lithium alanate of the anthranilic acids or esters substituted accordingly, in a lower aliphatic ether, preferably in tetrahydrofuran or 1,2-dimethoxyethane or mixtures of the two.

The novel 3-phenyl-(3H)-benzo-1,2,3-triazinones-(4) prepared according to the present invention possess antisecretory, muscle-relaxant and tranquilizing properties which do not impair mental acuity and have extraordinarily low toxicity.

The following examples supply information on the manufacturing processes for and physical constants of the new compounds.

EXAMPLE 1

3-(2'-hydroxymethyl-phenyl)-(3H)-benzo-1,2,3-triazinone-(4)

Within a period of 2 hrs. a solution of 68.5 g. (0.5 mole) of anthranilic acid in 250 cc. of tetrahydrofuran is added dropwise to a suspension of 50 g. LiAlH$_4$ in 3 l. of dry ether while stirring very vigorously. After another 15 minutes hydrolysis is brought about slowly by means of 150 cc. of water and 50 cc. of 15% sodium hydroxide solution. The aluminium hydroxide slurry is sucked off and washed with ether. The combined ether phases are dried over Na$_2$SO$_4$. Following filtration, the solvent is distilled off in the rotary evaporator. The residue is recrystallized from benzene. M.P.: 82–83° C. Yield of o-amino-benzyl alcohol: 51 g. (83% of theory).

Alternative: 15.3 g. (0.1 mole) of o-nitrobenzyl alcohol are dissolved in 150 cc. of ethanol, and to this solution 12.5 g. (0.25 mole) of hydrazine hydrate are added. Following addition of a spatula point full of Raney nickel, the mixture is first stirred for 1 h. at 20° C., then for 1 h. under reflux. From time to time Raney nickel is added still by small amounts. After filtration the filtrate is evaporated to dryness. The residue is washed with a small amount of cold water; it can be processed immediately after drying. Yield: 12.3 g. (quantitively).

94.6 g. of o-amino-benzyl alcohol are dissolved in 0.75 l. of dioxane; following addition of 113.5 g. of K$_2$CO$_3$, a solution of 143.5 g. of o-nitrobenzoyl chloride in 375 cc. of dioxane is added dropwise over 1 h. The mixture is stirred for 1.5 hrs. at 20–30° C., then introduced into 7 l. of water and the precipitated product sucked off through a suction filter. The substance melts at 169–70° C. (from isopropanol). Yield of 2'-hydroxymethyl-2-nitrobenzanilide: 156 g. (74.7% of theory).

Alternative: 12.3 g. (0.1 mole) of o-amino-benzyl alcohol are dissolved in 100 cc. of 1,2-dichloroethane. 9.5 g. (0.12 mole) of pyridine and 19.5 g. (0.105 mole) of o-nitrobenzoyl chloride dissolved in 50 cc. of 1,2-dichloroethane are added, and then the mixture is heated to boiling for 1 h. while stirring. The solvent is distilled off, the residue digested with 1 N HCl and filtered off. The product is washed neutrally, dried and recrystallized from methanol. Yield of 2'-hydroxymethyl-2-nitrobenzanilide: 26.1 g. (93% of theory).

156.6 g. of 2'-hydroxymethyl-2-nitrobenzanilide are hydrogenated in dioxane by means of Raney nickel, at normal pressure and room temperature. Following removal of the nickel catalyst the dioxane phase is concentrated to dryness and the residue recrystallized from isopropanol. M.P. 138–140° C.; yield of 2-amino-2'-hydroxymethyl benzanilide: 117 g. (84.5% of theory).

Alternative: 16.9 g. (0.06 mole) of 2'-hydroxymethyl-2-nitrobenzanilide are dissolved in 150 cc. of ethanol, and to this solution 7.5 g. (0.15 mole) of hydrazine hydrate are added. One spatula point full of Raney nickel is added while stirring whereupon the solution starts to warm. After 30 min. the reaction is terminated. Following filtration the filtrate is evaporated; the residue is dissolved in 2 N HCl and the solution filtered off of any undissolved by-products. By means of alkalization the amine is separated again. M.P. 139–140° C. Yield of 2-amino-2'-hydroxymethylene-benzanilide: 13.7 g. (94% of theory).

117 g. of 2-amino-2'-hydroxymethylene-benzanilide are dissolved in 1.4 l. of 3 N $H_2SO_4$, and to this solution a solution of 39.2 g. of $NaNO_2$ in 80 cc. of water is added dropwise within 45 min., at −5 to −3° C. Subsequently the mixture is stirred vigorously for 15 min. at −5° C., and for 1.5 hrs. at 25 to 30° C. The product so obtained is separated and recrystallized from isopropanol. M.P. 165–166° C. (from isopropanol or benzene). Yield of 3-(2'-hydroxymethyl-phenyl) - (3H) - benzo-1,2,3-triazinone-(4): 103 g. (84% of theory).

*Analysis.*—Calcd. for $C_{14}H_{11}N_3O_2$ (253.24) (percent): C, 66.40; H, 4.38; N, 16.59. Found (percent): C, 66.25; H, 4.20; N, 17.03.

EXAMPLE 2

3-(2'-acetoxymethyl-phenyl)-(3H)-benzo-1,2,3-triazinone-(4)

25.3 g. (0.1 mole) of 3-(2'-hydroxymethyl-phenyl)-(3H)-benzo-1,2,3-triazinone-(4) are dissolved in 400 cc. of dioxane, and to this solution 60 g. of acetanhydride and 0.5 cc. of triethylamine are added. The mixture is heated for 3 hrs. under reflux, then the solvent removed under vacuum and the residue recrystallized from isopropanol. Yield: 16.0 g. (54% of theory) of a M.P. of 92–93° C.

Calcd. for $C_{16}H_{13}N_3O_3$ (295.31) (percent): C, 65.08; H, 4.44; N, 14.23. Found (percent): C, 65.11; H, 4.44; N, 14.13.

EXAMPLE 3

3-(2'-N-ethyl-carbamyloxymethyl-phenyl)-(3H)-benzo-1,2,3-triazinone-(4)

5 g. of 3-(2'-hydroxymethyl-phenyl)-(3H)-benzo-1,2,3-triazinone-(4), 7 cc. of ethylisocyanate and 2 drops of triethylamine are heated in the oil bath for 40 min. under reflux. While still hot, the homogenous phase is extracted with petroleum ether and the extract discarded. The residue crystallizes when rubbed with petroleum ether/benzene 5:1. Yield: 6.0 g. (93% of theory) of a M.P. of 113.5–115° C. (from isopropanol).

Calcd. for $C_{17}H_{16}N_4O_3$ (324.30) (percent): C, 62.96; H, 4.97; N, 17.27. Found (percent): C, 62.98; H, 5.09; N, 17.32.

EXAMPLE 4

3-(2'-N-n-butyl-carbamyloxymethyl-phenyl)-(3H)-benzo-1,2,3-triazinone-(4)

Preparation is effected according to Ex. 3, using n-butylisocyanate. Yield: quantitative. Colorless crystals of a M.P. of 87–89° C. (from petroleum ether/isopropanol=1:1).

Calcd. for $C_{19}H_{20}N_4O_3$ (352.4) (percent): C, 64.76; H, 5.72; N, 15.90. Found (percent): C, 65.11; H, 5.77; N, 15.58.

EXAMPLE 5

3-(2'-hydroxymethyl-5'-chloro-phenyl)-(3H)-benzo-1,2,3-triazinone-(4)

A solution of 107 g. of 4-chloroanthranilic acid in 3.5 l. of ether plus 0.5 l. of tetrahydrofuran is added dropwise over 4 hrs. to a suspension of 30 g. of $LiAlH_4$ in 0.5 l. of dry ether. The mixture is heated to 30–40° C. for 1.5 hrs. Then disintegration is brought about by means of 120 cc. of water and 30 cc. of 15% NaOH. After filtration, the filtrate is dried over $Na_2SO_4$. Following removal of the solvents, the residue is recrystallized from isopropanol. 41.5 g. (43% of theory) of 2-amino-4-chloro-benzyl alcohol of a M.P. of 141–142° C. are obtained.

15.76 g. (0.1 mole) of 2-amino-4-chloro-benzyl alcohol are introduced into a suspension of 10.5 g. of $K_2CO_3$ in 200 cc. of dioxane, and to the mixture a solution of 19.0 g. of o-nitrobenzoyl chloride in 20 cc. of dioxane is added gradually. The product obtained as kept at 60° C. for 1.25 hrs., the dioxane distilled off under vacuum and the residue poured into 1 l. of water. The product filtered and dried is recrystallized from butanol/ligroin=2:1. Yield of 2'-hydroxymethyl-5'-chloro-2-nitrobenzanilide: 11.0 g. (38% of theory) of a M.P. of 186–188° C.

13.4 g. of 2'-hydroxymethyl-5'-chloro-2-nitrobenzanilide are hydrogenated in dioxane, at room temperature and 1 atm. of hydrogen pressure, in the presence of Raney nickel. The residue of the dioxane phase is recrystallized from toluene. 11.0 g. (91% of theory) of 2'-hydroxymethyl-5'-chloroanthranilanilide of a M.P. of 140–141° C. are obtained.

11.0 g. of 2'-hydroxymethyl-5'-chloroanthranilanilide are dissolved in a mixture of 140 cc. of 3 N $H_2SO_4$, 56 cc. of n-propanol and 30 cc. of dioxane and diazotized at 0° C. by means of a solution of 2.76 g. of $NaNO_2$ in 6 cc. of water. The product of diazotization is kept at 0° C. for 30 min., at 35–40° C. for 30 min., and then the precipitate is separated. It is recrystallized from isopropanol, yielding 5.8 g. (48% of theory) of the product as stated above. M.P. 132–133° C.

Calcd. for $C_{14}H_{10}ClN_3O_2$ (287.7) (percent): C, 58.45; H, 3.48; Cl, 12.32; N, 14.58. Found (percent): C, 58.51; H, 3.60; Cl, 12.39; N, 14.70.

EXAMPLE 6

3-(2'-propionoxymethyl-phenyl)-(3H)-benzo-1,2,3-triazinone-(4)

25.3 g. (0.1 mole) of 3-(2'-hydroxymethyl-phenyl)-(3H)-benzo-1,2,3-triazinone-(4) dissolved in 400 cc. of dioxane are heated to boiling for 5 hrs. together with 75 g. of propionic acid anhydride and 0.5 cc. of triethylamine. Following removal of the solvent by means of distillation, the residue is recrystallized from isopropanol. Yield: 19.4 g. (64.5% of theory) of a M.P. of 68–69° C.

Calcd. for $C_{17}H_{15}N_3O_3$ (309.33) (percent): C, 66.00; H, 4.89; N, 13.59. Found (percent): C, 65.78; H, 5.07; N, 13.69.

EXAMPLE 7

3-(2'-isovaleryloxymethyl-phenyl)-(3H)-benzo-1,2,3-triazinone-(4)

25.3 g. (0.1 mole) of 3-(2'-hydroxymethyl-phenyl)-(3H)-benzo-1,2,3-triazinone-(4) are reacted with isovaleric acid anhydride, according to Example 6. The crude product is recrystallized from cyclohexane. Yield: 19.0 g. (56% of theory) of a M.P. of 50° C.

Calcd. for $C_{19}H_{19}N_3O_3$ (337.39) (percent): C, 67.64; H, 5.68; N, 12.46. Found (percent): C, 67.81; H, 5.57; N, 12.45.

EXAMPLE 8

7-chloro-3-(2'-hydroxymethyl-phenyl)-(3H)-benzo-1,2,3-triazinone-(4)

33.4 g. of 4-chloro-2-nitro-benzoic acid are taken up in 160 cc. of 1,2-dichloroethane plus 0.4 cc. of dimethylformamide; then 26.2 g. of thionyl chloride are added, and the mixture is heated to boiling for 2 hrs. The solvent and the excess $SOCl_2$ are distilled off and the residue taken up in 30 cc. of dioxane. This solution is added dropwise to 12.3 g. of o-amino-benzyl alcohol in 100 cc. of dioxane with addition of 14.75 g. of $K_2CO_3$, the temperature not being allowed to exceed 20° C. After 1 h. the mixture is poured onto ice water and filtered. The solid is recrystallized from dioxane. Yield of 2'-hydroxymethyl-2-nitro-4-chloro-benzanilide: 14 g. of a M.P. of 155–157° C.

14 g. of the product obtained by the above process are hydrogenated in tetrahydrofuran in the presence of Raney nickel, at room temperature and normal pressure. Following filtration the product is evaporated. The residue is recrystallized from isopropanol. 8.9 g. (78% of theory) of 2'-hydroxymethyl - 4 - chloro-anthranilanilide are obtained.

10.9 g. of 2'-hydroxymethyl-4-chloro-anthranilanilide are dissolved in a mixture of 120 cc. of 3 N $H_2SO_4$, 120 cc. of dioxane and 50 cc. of n-propanol, and diazotized with a solution of 3.23 g. of $NaNO_2$ in 7 cc. of water, at —3° C. Cyclization is performed by heating to 30° C. for 30 min. Following separation, the crude product is recrystallized from benzene. 6.74 g. (60% of theory) of the product as stated above are obtained. M.P. 168–169° C.

Calcd. for $C_{14}H_{10}ClN_3O_2$ (287.7) (percent): C, 58.45; H, 3.50; Cl, 12.32; N, 14.61. Found (percent): C, 58.28; H, 3.71; Cl, 12.45; N, 14.51.

EXAMPLE 9

7-chloro-3-(2'-acetoxymethyl-phenyl)-(3H)-benzo-1,2,3-triazinone-(4)

6.7 g. of 7-chloro-3-(2'-acetoxymethyl-phenyl)-(3H)-benzo-1,2,3-triazinone-(4) are dissolved in 70 cc. of dioxane and, following addition of 18 g. of acetanhydride and 0.1 cc. of triethylamine, heated for 3 hrs. under reflux. The mixture is distilled to dryness under vacuum, and the residue recrystallized from ethyl acetate. Yield: 4.7 g. (62% of theory) of a M.P. of 131–132° C.

Calcd. for $C_{16}H_{12}ClN_3O_3$ (329.76) (percent): C, 58.28; H, 3.67; Cl, 10.75; N, 12.74. Found (percent): C, 57.95; H, 3.59; Cl, 10.65; N, 12.97.

EXAMPLE 10

3-(4'-chloro-2'-hydroxymethyl-phenyl)-(3H)-benzo-1,2,3-triazinone-(4)

A solution of 51 g. of 2-amino-5-chloro-benzoic acid in 230 cc. of 1,2-dimethoxyethane is added dropwise to a suspension of 30 g. of $LiAlH_4$ in 2 l. of dry ether, while stirring. The mixture is stirred for 30 min. at 25° C., disintegrated with 120 cc. of water and 30 cc. of 15% NaOH. From the residue of the organic phases 38 g. (81% of theory) of 2-amino-5-chloro-benzyl alcohol of a M.P. of 110–111° C. are obtained by means of recrystallization from benzene.

38 g. of the above product are taken up in 300 cc. of dioxane; following addition of 35.6 g. of $K_2CO_3$, a solution of 45 g. of o-nitrobenzoyl chloride in 100 cc. of dioxane is added dropwise within 20 min. The mixture is heated to 30–40° C. for 1 h., then poured into 4 l. of ice water, and the crude product sucked off is recrystallized from ethanol. Yield of 2'-hydroxymethyl-5'-chloro-2-nitrobenzanilide: 47 g. (63% of theory) of a M.P. of 169–170° C.

46.5 g. of 2'-hydroxymethyl-5'-chloro-2-nitrobenzanilide are reduced to 2'-hydroxymethyl-5'-chloro-anthranilanilide, as described under Example 8. 34 g. (80% of theory) of a M.P. of 173–174° C. are obtained from isopropanol.

31 g. of the anthranil amide are diazotized at —5° C. in a mixture of 340 cc. of 3 N $H_2SO_4$, 220 cc. of n-propanol and 100 cc. of dioxane, by adding a solution of 9 g. of $NaNO_2$ in 20 cc. of water. Ring closure occurs upon 30 minutes' heating to 35° C. The precipitated product is removed and recrystallized from isopropanol. 13.3 g. (40% of theory) of the compound as stated above are obtained by this procedure. M.P. 147–148° C.

EXAMPLE 11

3 - (4',6'-dichloro-2'-hydroxymethyl-phenyl)-(3H)-benzo-1,2,3-triazinone-(4)

30 g. of $LiAlH_4$ are suspended in 2 l. of ether, and then a solution of 61.6 g. of 2-amino-3,5-dichloro-benzoic acid in 100 cc. of tetrahydrofuran plus 200 cc. of 1,2-dimethoxyethane is added dropwise over a period of two hours, while stirring vigorously. Stirring is continued for 45 min. still, at 20–25° C. The batch is processed as described under Example 10. 47 g. (84% of theory) of 2-amino-3,5-dichloro-benzyl alcohol of a M.P. of 119–120° C. are obtained (from toluene).

47 g. of 2-amino-3,5-dichloro-benzyl alcohol are introduced into a suspension of 42 g. of $K_2CO_3$ in 300 cc. of dioxane and, following addition of 46 g. of o-nitrobenzoyl chloride, heated for 1 h. to 40° C. in 100 cc. of dioxane. Then the batch is poured onto 4 l. of ice water. 54.8 g. (69% of theory) of 2'-hydroxymethyl-4',6'-dichloro-2-nitrobenzanilide of a M.P. of 190–191° C. are obtained following recrystallization of the crude product from n-butanol.

54.8 g. of the above compound are hydrogenated to 2'-hydroxymethyl - 4',6'- dichloro - anthranilanilide, as described under Example 8. Yield: 45.4 g. (92.5% of theory) of a M.P. of 149–150° C. (from xylene).

42 g. of 2'-hydroxymethyl-4',6'-dichloro-anthranilanilide are dissolved in a mixed phase of 400 cc. of 3 N $H_2SO_4$, 400 cc. of n-propanol and 100 cc. of dioxane, and the solution diazotized by means of a solution of 10.8 g. of $NaNO_2$ in 25 cc. of water. The product of diazotization is kept at 0° C. for 30 min. still, and then cyclized by heating it to 40° C. over a period of 30 mins. Then the product of cyclization is diluted to 1.5 l. with water, the crude product separated and recrystallized from ethanol/isopropanol=1:1. 19.5 g. (45% of theory) of the compound as stated above are obtained. M.P. 181–182° C.

EXAMPLE 12

3 - (2'- benzoyloxymethyl - phenyl) - (3H) - benzo-1,2,3-triazinone-(4)

12.65 g. (0.05 mole) of 3-(2'-hydroxymethyl-phenyl)-(3H)-benzo-1,2,3-tiazinone-(4), 37.5 g. of benzoic acid anhydride and 0.5 cc. of pyridine are heated to 125° C. for 2.5 hrs. The melt is cooled and immediately recrystallized from isopropanol. Yield: 15.3 g. (85% of theory) of a M.P. of 141–142° C.

Calcd. for $C_{24}H_{15}N_3O_3$ (357.37) (percent): C, 70.58; H, 4.23; N, 11.76. Found (percent): C, 70.30; H, 4.51; N, 11.66.

EXAMPLE 13

3 - (2'- succinyloxymethyl - phenyl) - (3H) - benzo-1,2,3-triazinone-(4)

25.3 g. (0.1 mole) of 3-(2'-hydroxymethyl-phenyl)-(3H)-benzo-1,2,3-triazinone-(4) and 10 g. of succinic acid anhydride are dissolved in 400 cc. of dioxane, and to the solution 10 g. of triethylamine are added. The mixture is heated to 90° C. for 5 hrs., then the solvent is removed under vacuum, and the residue is recrystallized 3 times from n-butyl acetate. Yield: 21 g. (60% of theory) of a M.P. of 134–135° C.

Calcd. for $C_{18}H_{15}N_3O_5$ (353.34) (percent): C, 61.19; H, 4.28; N, 11.89. Found (percent): C, 61.40; H, 4.54; N, 11.80.

EXAMPLE 14

6-chloro-3-(2'- hydroxymethyl-phenyl)-(3H)-benzo-1,2,3-triazinone-(4)

40.32 g. (0.2 mole) of 5-chloro-2-nitrobenzoic acid are dissolved in 180 cc. of $CH_2Cl_2$ with addition of 0.3 cc. of dimethylformamide and 25 g. of $SOCl_2$. The batch is heated to boiling for 2.5 hrs., then concentrated under vacuum and the crude acid chloride (44.8 g.) added immediately to a solution of 25.4 g. of o-amino-benzyl alcohol in 200 cc. of dioxane. A solution of 27 g. of N-ethyl-diisopropylamine plus 1 cc. of dimethylformamide is added dropwise at 20° C. over a period of 2 hrs., and subsequently the mixture is heated to 50° C. for 2 hrs. It is poured onto 3 l. of ice water, and the precipitated 2'-hydroxymethyl - 2 - nitro-5-chloro-benzanilide recrystallized from n-butanol. Yield: 41.8 g. of a M.P. of 180–181° C.

This product is hydrogenated at 20° C. in the presence of Raney nickel; after being processed as usual it is recrystallized from methanol. 26.3 g. of 2'-hydroxymethyl-5-chloro-anthranilanilide of a M.P. of 155–156° C. are obtained.

26.3 g. of the above product are diazotized at —5° C. in a mixture of 320 cc. of 3 N $H_2SO_4$, 200 cc. of n-propanol and 100 cc. of dioxane by means of 6.6 g. of $NaNO_2$ in 13 cc. of water. Ring closure is achieved by heating to 35° C. for 45 min. The precipitated reaction product is recrystallized from methanol. Yield of the compound as stated above: 16.7 g. (58% of theory) of a M.P. of 129–130° C.

Calcd. for $C_{14}H_{10}ClN_3O_2$ (287.71) (percent): C, 58.45; H, 3.47; Cl, 12.35; N, 14.61. Found (percent): C, 58.60; H, 3.58; Cl, 12.40; N, 14.60.

EXAMPLE 15

6-chloro-3-(2'-acetoxymehyl-phenyl)-(3H)-benzo-1,2,3-triazinone-(4)

16 g. of 6 - chloro-3-(2'-hydroxymethylphenyl)-(3H)-benzo-1,2,3-triazinone-(4) are dissolved in 100 cc. of dioxane and, upon addition of 40 g. of acetan/hydride and 0.5 cc. of triethylamine, heated for 3 hrs. under reflux. The solvent and excess acetan/hydride are distilled off under vacuum in the rotary evaporator, and the residue recrystallized from ethanol. Yield: 13.4 g. (73% of theory) of a M.P. of 120–120.5° C.

Calcd. for $C_{16}H_{12}ClN_3O_3$ (329.76) (percent): C, 58.28; H, 3.67; Cl, 10.75; N, 12.75. Found (percent): C, 58.27; H, 3.91; Cl, 10.55; N, 12.48.

Having described our invention, what we desired to secure by Letters Patent is:

1. 3-(2'-oxymethyl-phenyl) - (3H) - benzotriazinones-(4) of the formula

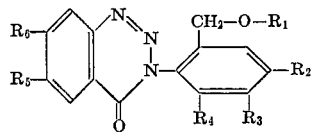

wherein $R_1$ is hydrogen atom, lower alkanoyl or carbamyl radical substituted with a carboxyl radical, or a benzoyl radical, and $R_2$ to $R_6$ represents a hydrogen or a halogen atom.

2. A compound as set forth in claim 1 wherein $R_1$ to $R_6$ are hydrogen.

3. A compound as set forth in claim 1 wherein $R_1$ is acetyl and $R_2$ to $R_6$ are hydrogen.

4. A compound as set forth in claim 1 wherein $R_1$ is N-n-butyl-carbamyl and $R_2$ to $R_6$ are hydrogen.

5. A compound as set forth in claim 1 wherein $R_1$ is propionyl and $R_2$ to $R_6$ are hydrogen.

6. A compound as set forth in claim 1 wherein $R_1$ is isovaleryl and $R_2$ to $R_6$ are hydrogen.

7. A compound as set forth in claim 1 wherein $R_1$ to $R_5$ are hydrogen and $R_6$ is chlorine.

8. A compound as set forth in claim 1 wherein $R_1$ is acetyl, $R_2$ to $R_5$ are hydrogen and $R_6$ is chlorine.

9. A compound as set forth in claim 1 wherein $R_1$ and $R_3$ to $R_6$ are hydrogen and $R_2$ is chlorine.

10. A compound as set forth in claim 1 wherein $R_1$, $R_3$, $R_5$ and $R_6$ are hydrogen and $R_2$ and $R_4$ are chlorine.

11. A compound as set forth in claim 1 wherein $R_1$ is benzoyl and $R_2$ to $R_6$ are hydrogen.

12. A compound as set forth in claim 1 wherein $R_1$ is hydroxysuccinyl and $R_2$ to $R_6$ are hydrogen.

13. A compound as set forth in claim 1 wherein $R_1$ to $R_4$ and $R_6$ are hydrogen, and $R_5$ is chlorine.

14. A compound as set forth in claim 1 wherein $R_1$ is acetyl, $R_2$ to $R_4$ and $R_6$ are hydrogen and $R_5$ is chlorine.

References Cited

UNITED STATES PATENTS 3,163,646  12/1964  Herlinger et al. ____ 260—248 X
3,316,262  4/1967  Hasspacher et al. ____ 260—248

JOHN M. FORD, Primary Examiner

U.S. Cl. X.R.
424—249